United States Patent [19]

Guestaux

[11] 4,203,769

[45] May 20, 1980

[54] RADIATION-SENSITIVE ELEMENTS HAVING AN ANTISTATIC LAYER CONTAINING AMORPHOUS VANADIUM PENTOXIDE

[75] Inventor: Claude Guestaux, Colombes, France

[73] Assignee: Eastman Kodak Company, Rochester, N.Y.

[21] Appl. No.: 705,187

[22] Filed: Jul. 14, 1976

[30] Foreign Application Priority Data

Jul. 15, 1975 [FR] France .................................. 75 22060

[51] Int. Cl.$^2$ ........................... G03C 1/00; G03C 1/06
[52] U.S. Cl. ................................ 430/631; 44/DIG. 2; 260/DIG. 16; 252/518; 423/592; 428/922; 430/56; 430/628
[58] Field of Search ................. 96/87 A, 1.5; 252/518, 252/518.4, 313 R; 428/922; 260/DIG. 18; 423/592

[56] References Cited

U.S. PATENT DOCUMENTS

| | | | |
|---|---|---|---|
| 3,245,833 | 4/1966 | Trevoy | 96/87 A X |
| 3,622,523 | 11/1971 | Amin et al. | 252/514 |
| 3,839,231 | 10/1974 | Patterson et al. | 252/514 |
| 3,874,878 | 4/1975 | Rasch et al. | 96/87 A |
| 3,886,578 | 5/1975 | Eastwood et al. | 252/518.4 X |

FOREIGN PATENT DOCUMENTS

2203783 5/1974 France .
958103 5/1964 United Kingdom .

OTHER PUBLICATIONS

Baynton et al., "Semiconducting Properties of some Vanadate Glasses," *Journal of the Electrochemical Society*, Apr. 1957, pp. 237-240.
Chemical Abstracts, vol. 68, 1968, 98249q.
Hamblen et al., "Preparation of Ceramic Semiconductors from High-Vanadium Glass," *Journal of the American Ceramic Society*, vol. 46, No. 10, Oct. 1963, pp. 499-504.
Chemical Abstracts, vol. 73, 1970, 30024k.

*Primary Examiner*—John D. Welsh
*Attorney, Agent, or Firm*—A. P. Lorenzo

[57] ABSTRACT

An antistatic layer of a radiation-sensitive element, such as a photographic film or paper, is formed by coating and drying of an antistatic composition comprising an aqueous solution of an amorphous antistatic material, the aqueous solution having been produced by forming a melt comprised of at least 80% by weight of vanadium pentoxide and casting the melt into a solubilizing amount of water. In addition to vanadium pentoxide, the melt can contain a glass-forming compound, such as an alkaline metal phosphate or polyphosphate, as well as an oxide of an element that exists in at least two valence states, such as an oxide of molybdenum. The radiation-sensitive element preferably includes a protective overcoat layer covering the antistatic layer.

16 Claims, No Drawings

RADIATION-SENSITIVE ELEMENTS HAVING AN ANTISTATIC LAYER CONTAINING AMORPHOUS VANADIUM PENTOXIDE

BACKGROUND OF THE INVENTION

1. Field of the Invention

The present invention concerns a novel antistatic composition comprising a semiconductor material, substantially amorphous vanadium pentoxide, $V_2O_5$, in an aqueous solution. The composition is usable for the preparation of antistatic coatings and layers designed, in particular, for photographic, cinematographic, magnetic, and electrographic elements or products of manufacture, and for the preparation of antistatic fibers and filaments.

In the following, the invention is described in a general manner referring to photographic products. However, it is to be understood that the invention applies to all products for which the problem of removal of electrostatic charges arises.

2. Description of Prior Art

It is well known that numerous types of photographic film supports have the tendency to produce charges of static electricity during winding and unwinding, and that these charges do not easily dissipate, because the materials that are used as film supports usually are poor electrical conductors. High potentials that thusly have been created often discharge suddenly in the course of manufacture or in the course of utilization of the product by the user, causing flashes of light from static electricity and an undesirable recording of the static electricity discharge on a radiation-sensitive layer, such as a layer of photographic emulsion. In order to avoid this result, it is customary in the prior art to apply to the backing of the film support an electrically conductive layer, also referred to herein as an antistatic layer, to make it possible to facilitate the dissipation of the static charges, and thus avoid the sudden discharges and the resulting light flashes which otherwise would damage the radiation-sensitive layer.

Known antistatic layers generally consist of a binder in which is dispersed an organic or inorganic conductive substance to render the surface on which the layer is coated, for example, a film support, sufficiently conductive to make possible the flow of the electrostatic charges to a discharge means. Most often, antistatic layers are more or less hygroscopic layers, the efficiencies of which vary as a function of the degree of humidity in the air. Thus, such layers are not very suitable for use under conditions of low relative humidity because they are no longer sufficiently conductive. Likewise, such hygroscopic layers are not very suitable at conditions of high humidity because they become sticky. It is difficult then to separate them from the surfaces to which they adhere. The effort that is necessary to separate two superimposed layers, for example, sometimes creates charges higher than those that would appear in the absence of any antistatic layer.

In order to remove these electrostatic phenomena, the prior art suggests, e.g., the use of mixtures, such as those described in French Pat. No. 1,089,923, that comprise two compounds, one of these compounds being selected from among the alkyl phosphates of alkaline metals, and the salts of alkaline metals, of ammonium, or of amines, of cellulose sulfates or cellulose acetate-sulfate, the other compound being a spreading agent selected from among the higher fatty acid esters and polyalcohols. The prior art has also described use for this purpose of the alkaline or diester ammonium salts formed from ortho-phosphoric acids and aliphatic alcohols, such as those described in French Pat. No. 1,282,354.

Antistatic compositions also are known that comprise as an antistatic agent an alkaline metal salt having an atomic weight at least equal to 23, and an organic mono- or diester of phosphoric acid, in an organic or aqueous medium, and that may, in addition, contain a binder.

However, these known antistatic layers do not display all the qualities that are required in an antistatic layer, especially under changes in humidity conditions. They display, in fact, a surface receptiveness, e.g. coatability, that is often insufficient, a substantial variation in resistivity, as a function of the relative humidity, a loss of the antistatic effect after passage through processing baths in the case of photographic and cinematographic products, and a friction coefficient that is not easily adaptable to the type of utilization that is considered.

Trevoy, U.S. Pat. No. 3,245,833 issued Apr. 12, 1966, and U.S. Pat. No. 3,428,451 issued Feb. 18, 1969, describes electrically conductive supports comprising a semiconductor compound, e.g. cuprous iodide, or a complex of such compound, dispersed in a film-forming vehicle, and their use in radiation-sensitive elements. The cuprous iodide compounds are usually deposited from organic solvents. In contrast to such cuprous iodide systems, the $V_2O_5$ of the present invention can be coated from an aqueous or hydro-organic system to form an antistatic layer using a water soluble binder.

In my copending patent application, Ser. No. 654,441 filed Feb. 2, 1976, now abandoned, I have disclosed antistatic compositions formed of a solution in water of a vitreous compound obtained by fusion of a glass-forming compound, such as an alkaline metal phosphate or polyphosphate, associated with one or more modifying compounds, which are transition metal oxides, such as $V_2O_5$, which may display several states of valence in the final vitreous compound. Those vitreous compounds are obtained by casting the mixture of oxides in the melted state on a cooled metallic plate. The fused product is ground and dissolved to form a solution for use in an antistatic composition. The process of casting is generally satisfactory for preparing vitreous compounds having a low concentration of the modifying compound present. However, with a high concentration of modifying oxides present, which is of interest, since it is these modifying compounds that provide the desired conductive properties, the fused compositions become devitrified before solidification of the melted mixture. The resulting product in such cases is polycrystalline, heterogeneous, and usually insoluble.

Vanadium pentoxide, $V_2O_5$, is a particularly interesting oxide for obtaining compositions having satisfactory conductive properties for the use in antistatic layers. One aim of the present invention is to avoid the above solidification problem and thereby to obtain an amorphous composition of vanadium pentoxide that one may easily apply in a thin layer to a surface of a support or substrate.

It is known that one may prepare colloidal vanadium pentoxide solutions and that such solutions are already the object of numerous studies. Thus, according to J. B. Donnet in the *Journal de Chimie Physique* (Journal of Physical Chemistry), No. 50, page 363 and following (1953), such solutions, which may be prepared by means of different processes (among which is the method of Erich Muller, consisting in projecting $V_2O_5$ maintained at the melting temperature (about 700°C.) in cold distilled water), contain particles the chemical nature of which has caused a certain controversy. Donnet teaches that the dried product of colloidal solutions of $V_2O_5$ is crystalline (page 364). Erich Muller, in an article published in Kolloid Z. 8 P. 302 (1911), mentions that $V_2O_5$ dissolves very little in water and that it is possible to obtain a colloidal solution by projecting, as indicated, previously, $V_2O_5$ maintained at the melting temperature into cold distilled water. However, the dried product obtained from Muller's process cannot be redissolved in distilled water.

A. Revcolevschi, during a conference held Dec. 13, 1973, before the Society for the Encouragement of National Industry, (France) described a then novel method for obtaining amorphous structures of oxides or of mixtures of oxides. *J. Material Sciences*, Vol. 8, P. 1359 (1973). His process, called hyperquenching, consists in rapidly cooling a metal oxide in the liquid or vapor state by contacting it with a heat conductive surface in a method analogous to "splat-cooling." "Splat-cooling" was first developed by P. Duwez et al, *J. Appl. Phys.* V. 31, P. 1136, (1960) for quenching metals and alloys. For a hardening from the liquid state to be efficient, it is necessary that the speed of cooling of the material be exceptionally high at the moment of transition from liquid to solid. This hyperquenching step requires an extremely high speed of heat-exchange at this precise moment. Duwez et al have shown that the mechanism of rapid heat-exchange by means of conduction is the most efficient method, if the following conditions are respected:

the substratum on which the hardening is carried out is an excellent heat-conductor;

the heat contact is as perfect as possible;

the distance between the liquid and the substratum is as small as possible;

the time for the passage from the liquid state to the solid state is as short as possible.

Revcolevschi, ibid, proposes different processes to obtain the above result. It was possible to obtain, with the described processes, amorphous metal oxide structures, because the speed of hardening attained was sufficiently rapid so as to solidify the liquid-state structure. Also, Revcolevschi teaches that it is possible to obtain amorphous phases from oxides or mixtures of oxides, such as $V_2O_5$, $TeO_2$, $MoO_3$ and $WO_3$. However, the methods of rapid cooling described by Duwez et al and by Revcolevschi are taught to be used to form solid glasses by a rapid liquid-to-solid state transition. No formation of a colloidal dispersion of an oxide or of a mixture of oxides is taught or suggested by the authors. Although Duwez et al, ibid, state that the classical method for achieving high rates of cooling consists of injecting a small droplet of molten alloy into a liquid quenching bath, neither Duwez et al or Revcolevschi teach or suggest formation of a colloidal dispersion of $V_2O_5$ by a "splat-cooling," or hyperhardening method or rapid casting and quenching of fused metal oxides into water to thereby achieve formation of an amorphous $V_2O_5$ which also is in colloidal solution form.

In the vanadium glass making art, Patterson et al, U.S. Pat. No. 3,839,231 issued Oct. 1, 1974, describe a vanadium glass frit made by melting or fusing together in air vanadium pentoxide and normal glass constituents well known in the glass making art, e.g. other metal oxides besides $V_2O_5$, and pouring the melt into water to form a frit or grinding the fused mass to recover a millable powder. The frit or powder then is milled to a desired fineness and used to prepare pastes in liquid vehicles for use in making fired electrical elements having semi-conductive to metallic behavior.

SUMMARY OF THE INVENTION

The present invention relates to a novel antistatic composition comprising as an antistatic material vanadium pentoxide, $V_2O_5$, alone or in a major amount in admixture with a glass-forming compound and possibly other metal oxides, prepared and recovered as an aqueous solution by a process comprising heating the compounds to a temperature at least about 100° C. above the melting point of $V_2O_5$ (which is 690°C.), and casting the molten mass into a solubilizing amount of water, maintained at room temperature, said molten mass being at a temperature at least 50° C. above the melting point of $V_2O_5$ when it enters the water. The resulting solution is used to prepare antistatic compositions used in antistatic layers of various articles, particularly radiation-sensitive articles.

According to an embodiment of the invention, one may use, to obtain a solution of the invention, the mixtures described in French patent application and published under the number 2,303,310 75 07137 filed on March 7, 1975 by the Applicant, which contain a major amount of $V_2O_5$ and a lower amount of a glass forming compound, such as an alkali metal phosphate or polyphosphate, to prepare the antistatic material. In this case, one may also use at least one metal oxide modifier compound in association with $V_2O_5$, e.g. molybdenumoxide. Preferably, the amount of glass-forming compound does not exceed approximately 20%, by weight, dry basis, and preferably 15%, of the antistatic material, whether as $V_2O_5$ alone, or as admixture, e.g. $V_2O_5 + MoO_3$. The amount of $V_2O_5$ in such a modified glass forming mixture is always at least 80% by weight, dry basis prior to melting of the mixtures.

Examples of the modifier compound are compounds of Groups 4a, 5a, 5b and 6b of the Periodic Table of Elements, particularly $MoO_3$, $WO_3$, $Sb_2O_3$ and $GeO_2$.

Examples of phosphates are alkali metal phosphates and polyphosphates represented by sodium tripolyphosphate $Na_5P_3O_{10}$, Graham salt $(NaPO_3)_x$ (e.g., sodium metaphosphate, $NaPO_3$), sodium hexametaphosphate $(NaPO_3)_6$, sodium pyrophosphate $(Na_4P_2O_7)$, and trisodium phosphate $(Na_3PO_4)$ and corresponding potassium phosphates and polyphosphates useful for such purpose.

It is also possible to obtain an aqueous solution according to the invention from the mixtures of compounds described in French patent application 74 22938 filed on July 2, 1974 by the Applicant and published under the number 2,277,136. These mixtures can contain a glass forming agent such as $P_2O_5$ and one or more modifying metal oxides such as $V_2O_5$, $MoO_3$ and the like. These mixtures can comprise in addition, an alkaline metal oxide, to increase their solubility without harming the conductivity. The alkaline metal oxide may be an alkali metal oxide selected, e.g. from among the group consisting of sodium oxide $(Na_2O)$ and potassium oxide $(K_2O)$, or it may be an alkaline oxide such as rubidium oxide $(Rb_2O)$, and cesium oxide $(Cs_2O)$.

One obtains interesting results with 5% by weight of alkaline metal oxide in relation to the total weight of the mixture.

In addition, according to the desired color, one can incorporate into the mixture an oxide of at least one rare-earth metal as a coloring agent. One uses, preferably, a quantity of approximately 4% of the total weight of the mixture.

Product in strip or in sheet prepared according to the invention, which comprises an antistatic layer, is characterized in that said antistatic layer is a practically amorphous layer and contains an antistatic material comprising at least 80% by weight, and preferably at least 85% by weight, of $V_2O_5$, vanadium pentoxide.

In the present description, the expression "practically amorphous layer" qualifies a layer consisting of a material, the analysis of which by means of diffraction to X-rays, shows that the material comprises 95%, and in the majority of cases, at least 98% of amorphous material.

Among the preferred products that one may thusly prepare, one may cite radiation-sensitive cinematographic and photographic products. A photographic product will comprise a photosensitive layer, e.g. particularly a gelatinosilver halide layer, contiguous to one surface of a support, such as a cellulose acetate or polyethylene terephthalate support and, contiguous to the other surface, an antistatic layer according to the invention.

As indicated above, it is interesting that a high concentration of the modifying compound, $V_2O_5$, be present in the antistatic composition since it is this modifying compound that provides the desired conductive properties.

It was mentioned above that the antistatic composition contains as an antistatic material at least 80% by weight of $V_2O_5$ vanadium pentoxide. According to an advantageous mode of embodiment, the amount of amorphous $V_2O_5$ is above 85%, and even 90%. The most preferred composition contains 100% of $V_2O_5$.

It was found that, as soon as the amount by weight of amorphous $V_2O_5$ in the antistatic material reaches and surpasses about 90%, a colloidal solution of $V_2O_5$ is obtained with an unusually high content of $V_2O_5$, so that it is possible to obtain high antistatic properties, e.g. high conductivity, with a lower deposited quantity of the antistatic material than is needed when a lesser amount of amorphous $V_2O_5$ is present.

DETAILED DESCRIPTION AND PREFERRED EMBODIMENTS

Consequently, in a preferred aspect, the present invention relates to a novel antistatic composition comprising, as an essential antistatic material thereof, amorphous vanadium pentoxide, $V_2O_5$, in aqueous colloidal solution form, than can be applied in the form of a coating layer which, when dried, displays surface resistivity which is relatively independent of the effects of relative humidity. The colloidal solution can be diluted with water or a hydro-organic solvent. The layer obtained is removable or stable during processing as a layer of a photographic element, has a good mechanical resistance and, depending on its method of utilization, displays a low or high friction coefficient.

The colloidal solution of amorphous $V_2O_5$ present on the novel antistatic composition hereof is prepared by a process which comprises heating $V_2O_5$ (or possibly the mixture of $V_2O_5$ and a glass forming agent in amount lower than about 10% by weight), to a temperature at least 100° C. above the melting point of $V_2O_5$ and a casting the resulting molten mass into a solubilizing amount of water maintained at room temperature, at a rate conductive to formation of a colloidal solution of $V_2O_5$, said molten mass being at a temperature at least 50° C. above the melting point of $V_2O_5$ when it enters the water. When there is a glass forming agent and possibly metal oxides such a $MoO_3$, heteropolyanions are found in the aqueous solution.

The melting point of vanadium pentoxide, $V_2O_5$, is reported to be 690° C. and its solubility in water is reported to be 0.5 g/liter at 20° C. (Lange's Handbook of Chemistry —11 th Edition —1970 - John A. Dean p. 4—143). Accordingly, in the process, the temperature of heating of $V_2O_5$ will be at least 790° C. and the temperature of casting the melted $V_2O_5$ will be at least 740° C.

One uses generally heating temperatures of 100° C. to 500° C. above the melting point of the $V_2O_5$, i.e. temperatures ranging from 790° C. to 1190° C. Preferably, one uses heating temperatures 200° C. to 410° C. above the melting point, i.e. ranging from 890° C. to 1100° C. The temperature of the melted $V_2O_5$ at the time of casting or dispersion into the water is maintained at a temperature sufficiently above the melting point of $V_2O_5$ to provide melted $V_2O_5$ which is "practically amorphous" as herein further described.

The distance between the melted mass and the water in which it is cast may be rather variable, and comprises, e.g. between 2 meters and several centimeters. However, the distance is usually selected to be less that about 15 cm, particularly if one uses no auxiliary heat-insulating device around the melt as it is being poured. One may thus obtain in a very short period of time the solubilization of relatively large quantities of $V_2O_5$ in substantially amorphous and colloidal form.

The volume of water used to form the colloidal solution should be at least sufficient to solubilize the $V_2O_5$ poured into it, and to dissipate the heat of quenching. In practicing the invention, it has been found that the amount of $V_2O_5$ present in the form of a colloidal solution when prepared is several times greater than Lange's handbook amount of 0.5 g/liter, and can be as much as 60 g/liter at 20° C., as more fully described later herein. Usually, the amount of $V_2O_5$ present in the colloidal solution when prepared will be about 30 g/liter of water at 20° C.

As indicated above, one may obtain concentrations of $V_2O_5$ in the above form reaching up to 60 g/liter, at 20° C. and even beyond. The Applicant thinks that this result is obtained because the melted mass that is cast into distilled water is at a temperature greatly above $V_2O_5$ melting temperature and under such conditions that it dissolves into the water while the $V_2O_5$ is at a temperature that is also at least 50° C. above its melting temperature.

As mentioned above, the aqueous solution can be diluted as desired with water or a hydro-organic solvent to obtain dilute solutions for use as an antistatic coating composition. Appropriate water miscible organic solvents comprise alcohols, low molecular weight ketones, dioxane or solvents that have a high dielectric constant, such as acetonitrile, dimethylformamide, dimethylsulfoxide and the like, to form an organic solvent and water vehicle for the antistatic material.

The antistatic composition according to the invention may also be a solution in an organic water-solvent mixture, such as those previously described, wherein the content of water represents 10% of the solvent mixture.

This property of the antistatic composition, containing only the amorphous colloidal $V_2O_5$ or its admixture according to the invention, of being water-soluble or soluble in a water-organic solvent mixture, makes it possible to incorporate into it binders consisting of natural, artificial, or synthetic high polymers that improve the mechanical properties of the antistatic layers obtained from the composition. Use of such binders makes it possible to impart to the layers very particular properties, such as the possibility of being optionally removable or unremovable from a support (e.g., in photographic solutions) during processing, providing a friction coefficient adaptable to a particular utilization, and imparting insensitivity of the conductivity of the antistatic layer to the variations of relative humidity. As the colloidal solution of $V_2O_5$ has a polymeric structure and consequently film-forming properties, the use of a binder is not necessary.

Among the binders usable in the antistatic compositions and layers according to the invention, one may cite, e.g., cellulose derivatives, such as cellulose acetate, cellulose acetobutyrate cellulose acetate phthalate, cellulose etherphthalate, methylcellulose, polyvinyl alcohols, soluble polyamides, styrene and maleic anhydride copolymers, copolymers prepared in emulsion, such as the copolymer of methylacrylate, vinylidene chloride and itaconic acid, modified polyesters and the like.

The amount of colloidal solution of $V_2O_5$ in the antistatic composition will usually be at least 0.1% by weight, but may be more, depending on the characteristics desired in the dried antistatic layer. Preferably, it will be from 0.1% to 2%.

It is also possible to add a wetting agent, such as that sold under the trade name "Antarox Co 346" by General Aniline Film Corporation or that sold under the trade name "Triton X 100" by Rohm and Haas Corp.

Antistatic compositions, according to the invention, may be applied onto various supports. They may be used with all products for which the problem or removal of electrostatic charges arises. Examples of products on which the antistatic composition can be applied comprise metal plates, metal sheets, films prepared from any usual polymeric film-forming materials, for example cellulose esters, such as cellulose acetate or cellulose acetate butyrate; polyesters such as polyethyleneglycol terephthalate; polycarbonates; copolyesters of ethyleneglycol terephthalate and isophthalate with 1,4-cyclohexanedimethanol; and polyolefins, e.g., polyethylene and polypropylene. One can also use a support or paper or other substrate surface coated with a suitable film-forming material, such as any of the above materials, particularly polyethylene or polypropylene.

The prepared solutions of colloidal amorphous $V_2O_5$ may be coated preferably after filtration to eliminate solid particles of non-colloidal $V_2O_5$, directly onto a surface of a support, more particularly as a backing layer of a polymeric photographic film, to obtain an antistatic layer very useful in the sense that the surface resistivity of the layer varies only slightly as a function of the humidity. In addition, the resistivity values of the layer are very low, because one may, compared to the layers prepared according to the aforecited pending patent application, form solutions of coating compositions containing a high concentration of $V_2O_5$ in amorphous form.

The coating processes that are used to apply the antistatic composition of this invention are roll coating processes which comprise using a wetting cylinder or roll, partly immersed in the solution to be applied, and a cylinder or roll around which moves the film support to be processed, and creating between them a solution meniscus that the support impinges against and is coated on at least one surface. However, one may use any of the conventional coating processes, such as hopper coating with removal of the excess quantity by means of an "air knife", brush coating, and other techniques used in the coating arts.

The quantity of antistatic composition which can be applied onto the supports may vary considerably. The coverage may vary from 10 $mg/m^2$ to 100 $mg/m^2$, but it can be higher, for example up to 6 $g/m^2$, if necessary. In photographic products, the antistatic composition is applied preferably at about 20 $mg/m^2$.

The antistatic layer may occupy various positions in the products to be treated, for example, it can be a backing layer, a sublayer. In photographic products, the antistatic layer is generally a backing layer.

In order to improve the mechanical properties of the layers, and particularly the friction coefficient, it is possible to apply, to the antistatic layers, a layer containing a suitable compound that makes it possible to impart the desired property, e.g., a lubricant such as carnauba wax. One may also apply a protective layer containing, e.g., cellulose etherphthalate, cellulose acetobutyrate.

It is possible to apply to the antistatic layer the two previously mentioned layers, or else a single layer containing both the binder and the lubricant. The antistatic layer retains, however, its conductive properties.

The antistatic layers obtained from the composition according to the invention may have a permanent or temporary character, depending on the use that is intended for the treated products. An advantage of the antistatic composition made according to this invention is that antistatic layers prepared from them, and which are made to be a permanent part of a coating on a support, such as in a radiation-sensitive, e.g. photographic product, remain conductive even after development and processing of the product through processing solutions and equipment.

It is to be noted according to the invention, (1) that by casting the melted mass of $V_2O_5$ at a temperature clearly above the melting point, one obtains more concentrated $V_2O_5$ solutions and, in particular, (2) that these solutions applied in layer to supports, impart to the latter excellent antistatic properties that are very stable when the relative humidity varies.

The antistatic layer, according to the invention, will be particularly useful in the manufacture of photographic and cinematographic films. Another field of application of the antistatic layers, according to the invention, is in the field of magnetic recording, wherein one uses magnetic tapes on the backing of which, in particular, one may apply during manufacture thereof an antistatic layer containing the antistatic composition of this invention to remove charges due to the friction of the tape in the various apparatus in which they can be used. One may also use the antistatic compositions, according to the invention, in electrophotographic products. One may apply them also to the preparation of antistatic fibers and filaments and to wrapping products, such as those used with radiographic products. The following examples illustrate the invention.

EXAMPLE 1

One melts in platinum crucibles, in an electric oven maintained at different constant temperatures, such as indicated in Table I, 30 g of $V_2O_5$ vanadium pentoxide. One maintains the metal oxide in fusion for 10 minutes at this temperature, then one casts, or pours, the melt into 1 liter of distilled water held in a quenching bath at 20° C. and stirred to favor the dispersion of heat. The outlet of the crucible containing the melted mass is placed at about 10 cm from the water surface. The casting is done rapidly to minimize cooling of the melt in the air during casting. At the end of the casting step the temperature of the water is brought from 20° C. to about 40° C. The resulting colloid is filtered to remove solid particles of non-colloidal $V_2O_5$. After filtration, one dilutes the colloidal solution with water to 2.5 g $V_2O_5/l$, coats the solution onto polyethyleneglycol terephthalate supports at a ratio of 20 mg/m$^2$ of the support, and one measures the surface resistivities of the obtained layers. The results are given in Tables I and II.

The surface resistivities are measured according to the ASTM D 257-67 standard.

In Table I, the values of the concentration are higher than in reality, because although the analysis is done after drying, there probably remains partially hydrated oxide, which explains the value of 31.3 for a temperature of the melted mass of 1,100° C.

TABLE I

| Heating Temp. of the melted $V_2O_5$ | Comments | Amorphous $V_2O_5$ concentration obtained in g/l water |
|---|---|---|
| 700° C. | Brown-red solution with insoluble | 20.5 |
| 850° C. | Brown-red solution with insoluble | 25.6 |
| 1000° C. | Brown-red - entirely soluble | 28.6 |
| 1100° C. | Brown-green - entirely soluble | 31.3 |
| 1200° C. | Greenish precipitate | 1.0 |

TABLE II

| Heating Temp. of the melted $V_2O_5$ | Surface resistivities in GΩ* | | |
|---|---|---|---|
| | 50% RH | 30% RH | 15% RH |
| 700° C. | 40 | 65 | 80 |
| 850° C. | 10 | 24 | 17 |
| 1000° C. | 1.6 | 1.5 | 16 |
| 1100° C. | 1.8 | 1.3 | 1 |

*GΩ = giga ohms = 1 × 10$^9$ ohms

One may note that one greatly improves the surface resistivity when the temperature of the melted mass passes from 700° C. to 1100° C. In addition, the resistivity is constant with the relative humidity, mainly for the solution obtained with the oxide melted at 1100° C. One obtains much higher concentrations for temperatures clearly above the melting point. However, when the temperature exceeds 500° C. above the melting point, i.e. above about 1190$_0$° C. one does not obtain the high concentrations of $V_2O_5$ which are of interest to form antistatic layers.

EXAMPLE 2

This example shows, on the one hand, that the surface resistivities decrease when the concentration in $V_2O_5$ increases and, on the other hand, that the surface resistivities vary only slightly as a function of the relative humidity ; and this all the less as the concentration in $V_2O_5$ is higher. One operates as in Example 1, except that one uses a solar furnace such as the Odeillo (Oriental Pyrenees) Solar furnace, (1000 KW). The results are given in Table III.

TABLE III

| Compound* | Amorphous $V_2O_5$ Concentration in g/l water | Surface Resistivities in GΩ | | |
|---|---|---|---|---|
| | | 50% RH (50) | 30% RH (30) | 15% RH (15) |
| $V_2O_5$ | 10.8 | 0.1 | 0.1 | 0.1 |
| | 7.2 | 0.2 | 0.5 | 0.3 |
| | 3.6 | 2.5 | 3 | 7 |
| | 1.8 | 18 | 85 | 270 |
| | 0.9 | 25 | 140 | 700 |

*Compound obtained with the Odeillo Solar furnace (temperature 1100° C.).

One may note the good constancy of the surface resistivity as a function of the relative humidity, especially for a high concentration in $V_2O_5$. The products obtained with the solar furnace lead substantially to the same properties as those prepared in an electric oven. The advantage of Solar furnace type of fusion resides in the rapid obtaining of the product in good quantities. One may, in fact, melt and cast 1 kg/min. of $V_2O_5$ to prepare the amorphous colloidal solution of $V_2O_5$ according to the invention.

Another advantage of this fusion process is the non-pollution of the melted material, since it can be cast directly into water to solubilize it.

EXAMPLE 3

By the process of Example 2, one prepares non colloidal solutions of a mixture of $V_2O_5$, $MoO_3$, and $Na_5P_3O_{10}$, or of mixtures of $V_2O_5$ and $Na_5P_3O_{10}$. The surface resistivities of the layers obtained from these solutions and coated on supports as in Example 1 were measured and the results are given in Table IV.

TABLE IV

| Compound* | Compound Concentration in g/l water | Surface Resistivities in GΩ | | |
|---|---|---|---|---|
| | | 50% RH (50) | 30% RH (30) | 15% RH (15) |
| $V_2O_5$—$MoO_3$—$Na_5P_3O_{10}$ 61-13-26** | 11.7 | 10 | 100 | 250 |
| | 7.8 | 30 | 300 | 2000 |
| | 3.9 | 40 | 2000 | 30000 |
| | 1.9 | 200 | 40000 | > |
| | 1 | 1400 | 120000 | > |
| $V_2O_5$—$Na_5P_3O_{10}$ 83-17** | 10.5 | 25 | 90 | 900 |
| | 7.0 | 80 | 550 | 2000 |
| | 3.5 | 240 | 2100 | 16000 |
| | 1.75 | 450 | 65000 | > |
| | 0.9 | 1300 | > | > |

*Compounds obtained with the Odeillo Solar furnace (temperature 1100° C.)
**parts by weight
> = excessively high By the melting and casting process of this invention, a colloidal gel of amorphous $V_2O_5$ have been obtained with a high concentration (up to 100 g/l but with special care). The gel has a thixotropic flow behavior, whereas dilute solution of $V_2O_5$ glass is Newtonian flow in behavior. The colloidal form of $V_2O_5$ has the same properties as a polymer, *Jl de Chimie Phys.* 50-363-1953- p. 291-309-364-389. By electric microscopy, the inventor has ascertained that the structure of a layer coated from a solution of colloidal $V_2O_5$ made according to his present process and coated on a poly(ethylene terephthalate) support film appears fibrous in structure.

EXAMPLE 4

A colloidal solution of $V_2O_5$ is prepared as in example 1 to have a concentration of 3.7 g/l.

The following composition is applied onto a polyethylene terephthalate base at a coverage of 20 mg/m$^2$.
- Latex of vinylidene chloride - methyl acrylate itaconic acid terpolymer (85-15-2 by weight) (3 g/l of dry materials in water)—500 ml
- Colloidal solution of $V_2O_5$ (3.7 g/l)—500 ml The concentration of $V_2O_5$ in the composition is 1.8 g/l.

The surface resistivities measured as in example 1, at 20° C., are 5 G Ω, 6 G Ω and 20 G Ω at respectively 50%, 30% et 15% RH.

EXAMPLE 5

The following composition is coated, at a coverage of 20 mg/m$^2$, onto a cellulose triacetate base :
Water—100 ml
Methanol—250 ml
Acetone—650 ml
Cellulose acetate—3 g
$V_2O_5$—1.3 g (corresponding to 30 ml of a colloidal solution of $V_2O_5$ at a concentration of 39 g/l).

The surface resistivities are 3 G Ω, 2 G Ω and 4 G Ω at respectively 50%, 30% and 15%, at 20° C.

The following examples illustrate the use of the antistatic composition according to the invention in a wrapping material.

When the wrapping material consists of a support, e.g. paper, and a metallic coating, when it is suddenly opened, statics are formed that may be more or less a nuisance, depending on the product contained in the wrapping material.

In a particular field, e.g. in radiography, some radiographic materials are protected by a lead envelope laminated on paper. Most of these wrapping materials have a varnish, in particular of nitrocellulose, which is coated on the lead sheet. However, the presence of the nitrocellulose coating creates high electrostatic fields and a friction coefficient which is not negligible. As a consequence, when the wrapping material is suddenly opened and the radiographic film is taken out after photographic processing, undesirable statics are formed in the emulsion. Furthermore, frictions between the radiographic films and the wrapping material are important and the protective layer is worn out by abrasion. The use as a wrapping material of a product comprising the previously described composition, which presents good mechanical properties makes it possible to avoid these disadvantages.

This product is particularly appropriate for radiographic materials, but it is possible to use it for wrapping materials other than those for radiographic materials, in which there is a problem of statics. Of course, the support and the metallic coating may be any substances appropriate for a particular application.

The product used for wrapping radiographic material comprises a paper support, a lead layer and an overlayer consisting of the previously described antistatic composition. The colloidal solution of $V_2O_5$, in the following examples, contains a polymer to improve the mechanical properties. In another embodiment, the antistatic layer is obtained from the colloidal solution of $V_2O_5$ and is overcoated by a layer containing a polymer.

EXAMPLE 6

A solution constituted by
$V_2O_5$ amorphous (dry product)—0.1 g (corresponding to 2.5 ml of a 4% solution)
Distilled water—10 ml
Acetone—90 ml
is coated onto a lead layer which adheres to a sheet of paper. The coating process used is a conventional technique, e.g. a kiss roll and an air knife.

An overlayer is then applied from the following composition
Cellulose acetobutyrate—1 g
Propylene chloride—90 ml
Ethanol—10 ml The surface resistivities at 50%, 30% and 15% RH, are respectively 3 G 106 , 3 G Ω and 5 G Ω.

EXAMPLE 7

A product such as that of example 6 is prepared but the antistatic solution also contains 0.1 g/100 ml of water of a surfactant (Triton X 100 sold by Rohm and Haas Corp.).

The surface resistivities at 50%, 30%, 15% RH are respectively 5 G Ω, 6 G Ω.

EXAMPLE 8

In this example, the polymer used to improve the mechanical properties is added to the colloidal solution of $V_2O_5$ and is not applied as an independent overcoat on the antistatic layer, as in examples 6 and 7.

The solution (1 1) is prepared as follows:
(1) Dissolution of 30 g of a 4.96% solution of $V_2O_5$ according to the invention in 500 ml of distilled water, with stirring up to complete dissolution.
(2) Adding 0.3 g of a dispersion of a matting agent, such as colloidal silica, in 360 ml of distilled water.
(3) Adding, with stirring, 100 g of a terpolymer of vinylidene chloride-acrylonitrile-acrylic acid, in emulsion (10% of dry product).
(4) Adding 10 ml of a 15% solution in distilled water of Triton X 100 surfactant.

The composition is applied onto a lead film as in example 6. The surface resistivities at 50%, 30% and 15% RH are respectively 8 G Ω, 10 G Ω and 12 G 106.

The following examples show that the antistatic layers obtained from the composition of the invention keep their conductive properties even when they are submitted to mechanical stresses, such as successive elongations which can reach up to 50% of the initial size.

EXAMPLE 9

A colloidal solution of $V_2O_5$ having the following formulation is applied, by the kiss roll method, onto a polyethylene terephthalate base.
$V_2O_5$—500 mg (dry product) (corresponding to 12.5 ml of a 4% colloidal solution of $V_2O_5$)
Distilled water—20 ml
Acetone—80 ml The solution is applied at a coverage of 200 mg/m$^2$. The surface resistivity is $1.10^6 \Omega$

EXAMPLE 10

The same solution as in example 9 is applied at a coverage of 900 mg/m$^2$. The surface resistivity is $1.10^7 \Omega$.

EXAMPLE 11

The same solution as in example 9 is applied at a coverage of 2.2 g/m². The surface resistivity is $6.10^6 \Omega$.

EXAMPLE 12

The following composition
$V_2O_5$ (dry product)—1000 mg (corresponding to 25 ml of a 4% solution)
Distilled water—100 ml
Non ionic surfactant—0.1 g ("Triton X 100" sold by Rohm and Haas)
is applied at a coverage of 1 g/m², by the hopper process, on an adhesive polymer layer coated on a polyethylene terephthalate base. The polymer layer can be constituted by a polymer, copolymer, or terpolymer of vinylidene chloride, in particular a terpolymer of vinylidene chloride, acrylic acid, itaconic acid.

The surface resistivity is $1.10^7 \Omega$.

EXAMPLE 13

An aqueous solution of $V_2O_5$ (2 g/100 ml) containing 0.1 g/100 ml of water of "Triton X 100" surfactant is applied by the hopper process, at a coverage of 4 g/m², onto an adhesive polymer layer coated on a polyethylene terephthalate base. The adhesive polymer layer is the same as in example 12.

The surface resistivity is $1.10^5 \Omega$.

The following table V gives the surface resistivities of the products obtained in examples 8 to 12 after various elongations of the products.

The elongations are carried out on 100 mm long and 35 mm wide samples placed between the clamps of an Instron dynamometer. The surface resistivities are measured according to the ASTM D 257-67 standard.

TABLE V

| Antistatic layer | Surface resistivity in $\Omega$, measured at 50% RH, 21° C. after an elongation of | | |
|---|---|---|---|
| | 0% | 10% | 50% |
| Example 9 | $1.10^6$ | $1.10^8$ | $5.10^9$ |
| Example 10 | $1.10^7$ | $1.10^8$ | $1.10^9$ |
| Example 11 | $6.10^6$ | $3.10^8$ | $8.10^8$ |
| Example 12 | $1.10^7$ | $1.10^9$ | $2.10^{10}$ |
| Example 13 | $1.10^5$ | $8.10^6$ | $7.10^7$ |

EXAMPLE 14

This example concerns antistatic layers, according to the invention, incorporated in photographic products which are to be treated in processing solutions.

This example shows that the antistatic layers, which are overcoated by a protective layer, have a permanent character and retain their conductive properties after treatment in usual photographic processing solutions.

Five cellulose triacetate supports are each coated with a composition prepared from a colloidal solution of $V_2O_5$ at a different concentration and 10 ml of distilled water and 90 ml of acetone. The concentration of the colloidal solutions is indicated in the table VI.

Three products (N° 3, 4 and 5) are overcoated with a protective composition cellulose acetobutyrate in a mixture of 10 ml of ethanol and 90 ml of propylene chloride.

The surface resistivities before and after processing are indicated in the table VI.

TABLE VI

| Test | $V_2O_5$ in solution (%) | Overcoat cellulose aceto butyrate (%) | Surface Resistivity in G$\Omega$ at 20° C. | | | | | |
|---|---|---|---|---|---|---|---|---|
| | | | Before treatment | | | After treatment | | |
| | | | 50% RH | 30% RH | 15% RH | 50% RH | 30% RH | 15% RH |
| 1 | 0.1 | | 2 | 1 | 1 | — | >300,000 | |
| 2 | 0.25 | | 3 | 0.7 | 0.6 | — | >260,000 | |
| 3 | 0.1 | 1 | 4 | 4 | 3 | 5.4 | 5 | 28 |
| 4 | 0.1 | 1.5 | 6 | 10 | 1 | 8 to 80 | 4 to 60 | 17 |
| 5 | 0.25 | 1 | 3 | 7 | 5 | 7 | 6 | 4 |

EXAMPLE 15

This example is used to compare the antistatic layer according to the invention and an antistatic layer obtained from a commercial product.

A cellulose triacetate support is coated with a colloidal solution of $V_2O_5$ at a coverage of 20 mg/dm². A protective layer containing cellulose acetobutyrate is then applied onto the $V_2O_5$ layer.

Another cellulose triacetate base sample is prepared for comparative purposes using as the antistatic material, in place of the amorphous $V_2O_5$, an antistatic product sold under the trade name ZELEC D. P. by E. I. DuPont de Nemours Company. The surface resistivities of the respective elements were measured and are compared in Table VII. It is shown in Table VII that the surface resistivities of the element coated on one surface with amorphous $V_2O_5$ are 3, 3, and 2 giga ohms at relative humidities of 15, 30 and 50%, respectively, at 22° C., whereas those of the element coated on one surface with ZELEC D. P. are $20 \times 10^5$, 3000 and 100 giga ohms, respectively at 15, 30 and 50% R. H. at 22° C. Accordingly, it is shown that the antistatic material, the colloidal solution of amorphous $V_2O_5$, made according to the invention, provides highly superior conductivity with about half the amount of antistatic material in the form of $V_2O_5$, than can be obtained with the well-known commercial product ZELEC D. P.

TABLE VII

Comparative Surface Resistivities of Elements Having Conductive Layer on Cellulose Triacetate

| Antistatic Agents | | Surface Resistivity Giga Ohms at 22° C. at | | |
|---|---|---|---|---|
| Material | Weight mg/m² | 15% R.H. | 30% R.H. | 50% R.H. |
| Amorphous $V_2O_5$ | 20 ± 2 | 3 | 3 | 2 |
| ZELEC, D.P. | 50 | $20 \times 10^5$ | 3000 | 100 |

The present invention is especially advantageous for use in manufacture of radiation-sensitive film, especially photographic film coated with a silver halide emulsion, comprising at least one layer comprising substantially amorphous vanadium pentoxide, $V_2O_5$, as a conductive material.

To make such radiation-sensitive elements, one can use any of the support materials used in the photographic arts. Such supports materials are typically polymeric, and include, for example, polyester film, polycarbonate film, cellulose acetate film, and related film, e.g. polystyrene film, which are useful in this art and which have a glass transition temperature above normal ambient atmospheric temperature. Usually, the film will be one having a glass transition temperature (Tg) whose endothermic peak as determined by means of a differential scanning calorimeter (DSC) at a heating rate of 20°K/min. is above about 60° C.

Suitable polyester film for use in this invention can be prepared from solid, linear, high-molecular weight polyesters derived by condensing a dihydric alcohol with a dibasic saturated fatty carboxylic acid or derivatives thereof. Suitable dihydric alcohols for use in preparing polyesters are well-known in the art and include any glycol wherein the hydroxyl groups are on the terminal carbon atom and contain from 2 to 12 carbon atoms, such as, for example, ethylene glycol, propylene glycol, trimethylene glycol, hexamethylene glycol, decamethylene glycol, dodecamethylene glycol, and 1,4-cyclohexane dimethanol. Dibasic acids that can be employed in preparing polyesters are well known in the art and include those dibasic acids containing from 2 to 16 carbon atoms. Specific examples of suitable dibasic acids include adipic acid, sebacic acid, isophthalic acid, and terephthalate acid. The alkyl esters of the above-enumerated acids can also be employed satisfactorily. Other suitable dihydric alcohols and dibasic acids that can be employed in preparing polyesters from which sheeting can be prepared are described in J. W. Wellman, U.S. Pat. No. 2,720,903, issued Oct. 11, 1955.

Specific examples of solid linear polyester resins which, in the form of sheeting or film, can be used in this invention are poly(ethylene terephthalate), poly(cyclohexane-1,4-di-methylene terephthalate), and poly(ethylene naphthalene dicarboxylate).

The thickness of the polyester sheet material employed in carrying out this invention is subject to variation. Polyester sheeting of a thickness of from about 2 mils to 50 mils can be advantageously utilized according to this invention. Usually, for photographic film products, the thickness of the polyester sheeting used will be of the order of from about 2 to 10 mils.

Polyesters, particularly poly(ethylene terephthalate) are very hydrophobic. Therefore, as is known in the art, the polyester sheeting used for making photographic film elements which can be made antistatic according to this invention are usually treated to make them hydrophilic and then are generally provided with an intermediate anchoring layer on at least one surface prior to the application to such surface of other conventional layers, for example, a light sensitive layer, or an anti-curl layer, as taught in U.S. Pat. No. 3,350,301. An intermediate anchoring layer is variously referred to in the art as an undercoating layer, a subbing layer, a sublayer, a substrate layer, or simply a "sub". A preferred polyester resin photographic film support having such a layer may be the subbed poly(ethylene terephthalate) which is described by Alles in U.S. Pat. Nos. 2,627,088 and 2,779,684. A preferred embodiment of this invention comprises heat-tempering such a subbed polymeric film.

Resins and resin compositions for use in providing such intermediate anchoring layers, or sublayers, on a surface of polyester film are well known in the art and may be present on the film either before or after applying the antistatic layer of the film without adversely affecting the practice of the invention. A suitable resin for subbing purposes is a terpolymer of the type taught in the Alles patents and comprised of, by weight, from about 35 percent to 96 percent of vinylidene chloride, from about 3.5 percent to 64.5 percent of an ethylenically unsaturated ester (also referred to as an acrylic ester), and from about 0.5 to 25 percent of itaconic acid or the half methyl ester of itaconic acid, acrylic acid, or methacrylic acid. The ethylenically unsaturated esters can be acrylonitrile, methacrylonitrile, vinyl chloride, and alkyl esters of acrylic and methacrylic acids having 1 to 18 carbon atoms in the alkyl group such as methyl acrylate, ethyl acrylate, butyl acrylate, methyl methacrylate, ethyl methacrylate and butyl methacrylate. A terpolymer of the above type that can be used satisfactorily in carrying out this invention is a terpolymer of methyl acrylate, vinylidene chloride and itaconic acid. A specific example of such terpolymer is one comprised of, by weight, about 15 percent of methyl acrylate, about 83 percent of vinylidene chloride, and 2 percent of itaconic acid.

To establish and maintain adequate and satisfactory adhesion of the sublayer to a surface of the polyester film to which it is applied, an adhesion promoter can be included in the subbing prior to application of the subbing layer to a surface of the polyester film. The subbing resins as above described are usually applied from a water dispersion (often referred to as a latex). The amount of adhesion promoter employed should be from about 0.1 percent to 5 percent by weight based on the weight of the subbing resin. Water is employed as a vehicle or carrier for the copolymer and the adhesion promoter when applied to the polyester film material. The water is subsequently removed from the applied coating by drying.

Examples of suitable adhesion promoters for this purpose include resorcinol, orcinol, catechol, pyrogallol, 1-naphtol, 2,4-dinitrophenol, 2,4,6-trinitrophenol, 4-chlororesorcinol, 2,4-dihydroxytoluene, 1,3-naphthalenediol, 1,6-naphthalenediol, acrylic acid, the sodium salt of 1-naphthol-4-sulfonic acid, benzyl alcohol, trichloroacetic acid, dichloroacetic acid, o-hydroxybenzotrifluoride, m-hydroxy-benzotrifluoride, o-fluorophenol, m-fluorophenol, p-fluorophenol, chloral hydrate, and o-creosol. Mixtures of two or more adhesion promoters can be employed, if desired.

To the subbed surface of the polyester film material there can be applied a matte coating composition. The "matte" portion of the matte layer can be any of a number of particulate conventional materials, ranging in particle size from about 1 to about 10 microns, that retain their particulate structure on the surface of the film product, the particulate layer (held in place by a hydrophobic resin binding agent) resulting in the desired, rough "matte"-type surface. Typical, nonlimiting examples of suitable "matte" materials include inorganic abrasive materials like silica, glass, quartz, diatomaceous earth, and calcium carbonate as well as organic resinous materials like the polyamide and interpolyamide resins described in U.S. Pat. No. 3,227,576.

Methods of preparing subbed, matte-surfaced polyester film are detailed in U.S. Pat. Nos. 3,227,576 and 3,589,905.

Suitable films for use as a support for the radiation-sensitive elements of this invention can also be prepared from cellulose esters, e.g. cellulose triacetate, containing from 42.5 to 44.0 percent acetyl. Such cellulose triacetate esters are described in U.S. Pat. Nos. 2,492,977, 2,492,978 and 2,739,069. However, a mixed cellulose ester, such as the cellulose acetate propionate described in U.S. Pat. No. 2,739,070, also may be used.

Photographic film elements which comprise an antistatic layer made according to this invention can otherwise be of conventional structure. They can be exposed, processed, and stored in conventional ways while retaining the antistatic properties and low surface resistivity provided to the element by compositions of this invention. The photographic film element will preferably comprise a radiation sensitive layer directly adhered to a support surface or to a subbing layer on a support material having a backing layer according to the invention. The radiation sensitive layer will preferably be a silver halide emulsion layer.

Emulsions containing various types of silver salts can be used to form the silver halide layers, such as silver bromide, silver iodide, silver chloride or mixed silver halides such as silver chlorobromide, silver bromoiodide or silver chloroiodide. Typical silver halide emulsions are taught in patents listed in *Product Licensing Index*, Vol. 92, December 1971, publication 9232, at page 107.

The silver halide emulsions used in combination with the conductive support of this invention can also contain other photographic compounds such as those taught in *Product Licensing Index*, op. cit., pages 107–110. The photographic compounds include development modifiers that function as speed increasing compounds, such as polyalkylene glycols, and others; chemical sensitizers, such as sulfur, gold and others; antifoggants and stabilizers, such as thiazolium salts, and others; developing agents, such as hydroquinone, and others; hardeners, such as aldehydes, and others; vehicles, particularly hydrophilic vehicles, such as gelatin, and others; brighteners, such as stilbenes, and others; spectral sensitizers, such as merocyanines, and others; absorbing and filter dyes, such as those described in Sawdey et al U.S. Pat. No. 2,739,971, issued Mar. 27, 1956, and others; color materials for color photography film elements, such as color-forming couplers in U.S. Pat. No. 2,376,679 issued May 22, 1945; and coating aids, such as alkyl aryl sulfonates, and others. The photographic compounds include, also, mixtures of coating aids such as those disclosed in U.S. Pat. No. 3,775,126, issued Nov. 27, 1973, which can be used in simultaneous coating operations to coat hydrophilic colloid layers on the subbing layers of elements intended for color photography, for example, layers of silver halide emulsions containing color-forming couplers or emulsions to be developed in solutions containing couplers or other color-generating materials as disclosed above.

The film elements can also comprise charge control agents which may be necessary in some cases to help control triboelectric charging of the elements below an electrostatic unit level detrimental to radiation sensitive elements. Such charge control agents may comprise perfluorohydrocarbons, e.g., cationic perfluorinated alkyl surfactant such as perfluoroctylsulfonamido (N-propyl3-N,N,N-trimethyl)ammonium iodide, and other agents described in French Pat. No. 2,146,777, issued Mar. 2, 1973, and in U.S. Pat. No. 3,850,642 issued Nov. 26, 1974.

Photographic layers which can be applied to the conductive support can include layers of other antistatic materials such as alkali metal salts of polymeric carboxylic acids or of cellulose sulfate described in U.S. Pat. No. 3,630,742.

The photographic layers applied to conductive support film can be coated on the film by various coating procedures used in coating other films and non-heat-tempered supports, including dip coating, air knife coating, curtain coating, or extrusion coating using hoppers of the type described in Beguin U.S. Pat. No. 2,681,294 issued June 15, 1954. If desired, two or more layers may be coated simultaneously by the procedure described in U.S. Pat. No. 2,761,791, referred to above, U.S. Pat. No. 3,508,947, and British Pat. No. 837,095. The support film also can contain silver halide layers coated by vacuum evaporation as described in British Pat. No. 968,453.

The conductive support of the invention can also be used in combination with silver halide for making elements used in dry development systems such as those described in patents listed in *Product Licensing Index*, op. cit., page 109, paragraph XX, and of direct print and printout photographic elements such as those described in patents listed at page 110, paragraph XXV of the publication.

The conductive support also can be used in elements intended for use in image transfer systems, such as those described in the patents listed at page 109, paragraph XIX of the above publication.

If desired, the photographic elements of this invention also can be processed in hardening developers such as those described in Allen et al U.S. Pat. No. 3,223,761 issued Feb. 1, 1966; in roller transport processors such as those described in Russell et al U.S. Pat. No. 3,025,779 issued Mar. 20, 1962; or by surface application processing as described in Example 3 of Kitze U.S. Pat. No. 3,418,132 issued Dec. 24, 1968.

The antistatic compositions of this invention can also advantageously be used in antistatic layers coated on photographic and other radiation sensitive papers having at least one layer of a resin coating such as photographic papers described in U.S. Pat. Nos. 3,501,298; 3,658,573; and 3,253,922; particularly paper coated with polyolefin, e.g. polyethylene or polypropylene, on both surfaces and subsequently treated with corona discharge or other treatment to make the resin surface hydrophilic.

The term "colloidal solution" as used herein refers to a solution intermediate in character between a true solution and a suspension. Such solutions may also be defined as dispersions where the particle size is between 10 and 5000 mu, where 1 mu$=10^{-6}$ mm.

Zelec D. P. is an aqueous dispersion of a polymeric cationic material and an anionic material and is sold by E. I. DuPont de Nemours.

Antarox Co 346 is a low foaming surfactant (sulfonated alkylphenoxypoly(ethyleneoxy)ethanol salt surfactant sold by General Aniline Film Corporation).

Triton X 100 is an octylphenoxypolyethoxyethanol surfactant sold by Rohm and Haas Corp.

The invention has been described in detail with particular reference to preferred embodiments thereof, but it will be understood that variations and modifications can be effected within the spirit and scope of the invention to obtain the advantages thereof.

I claim:

1. In a radiation-sensitive element comprising a support, at least one image-forming layer, and an antistatic layer; the improvement wherein said antistatic layer has been formed by the coating and subsequent drying of an antistatic composition comprising an aqueous solution of an amorphous antistatic material, said aqueous solution having been produced by forming a melt comprised of at least 80% by weight of $V_2O_5$ and casting said melt into a solubilizing amount of water, said melt having been heated to a temperature in the range of from 790° C. to 1190° C. and cast into said solubilizing amount of water while at a temperature of at least 740° C.

2. A radiation-sensitive element as claimed in claim 1 wherein said melt is comprised of at least 90% by weight of $V_2O_5$.

3. A radiation-sensitive element as claimed in claim 1 wherein said melt consists entirely of $V_2O_5$.

4. A radiation-sensitive element as claimed in claim 1 wherein the temperature to which said melt has been heated is in the range of from 890° C. to 1100° C.

5. A radiation-sensitive element as claimed in claim 1 wherein said melt comprises at least one glass-forming compound in addition to said $V_2O_5$.

6. A radiation-sensitive element as claimed in claim 5 wherein said glass-forming compound is an alkaline metal phosphate or polyphosphate.

7. A radiation-sensitive element as claimed in claim 5 wherein said glass-forming compound is a sodium phosphate or polyphosphate.

8. A radiation-sensitive element as claimed in claim 5 wherein said melt additionally comprises at least one modifier compound which is a metal oxide of an element that exists in said antistatic material in at least two valence states and is selected from Groups 4a, 5a, 5b and 6b of the Periodic Table of Elements.

9. A radiation-sensitive element as claimed in claim 8 wherein said modifier compound is selected from the group consisting of $MoO_3$, $WO_3$, $Sb_2O_3$, $Bi_2O_3$, and $GeO_2$.

10. A radiation-sensitive element as claimed in claim 8 wherein said modifier compound is $MoO_3$.

11. A radiation-sensitive element as claimed in claim 1 wherein said antistatic composition additionally comprises a binder.

12. A radiation-sensitive element as claimed in claim 11 wherein said binder is a cellulose derivative, a polyvinyl alcohol, a soluble polyamide, a styrene/maleic anhydride copolymer, or a copolymer of methyl acrylate, vinylidene chloride and itaconic acid.

13. A radiation-sensitive element as claimed in claim 1 wherein said support is a cellulose ester support, a polyester support, a polycarbonate support, a polyolefin support, or a polymer-coated paper support.

14. A radiation-sensitive element as claimed in claim 1 wherein said image-forming layer is a silver halide emulsion layer.

15. A radiation-sensitive element as claimed in claim 1 wherein said antistatic layer is overcoated by a protective layer.

16. A radiation-sensitive element as claimed in claim 1 wherein said antistatic layer is overcoated by a protective layer comprising a cellulose derivative.

* * * * *